(No Model.) 3 Sheets—Sheet 1.
P. RUDOLPH & O. NÄTHER.
IRIS DIAPHRAGM SHUTTER.
No. 524,670. Patented Aug. 14, 1894.
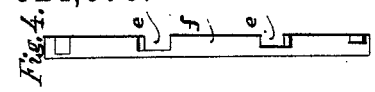
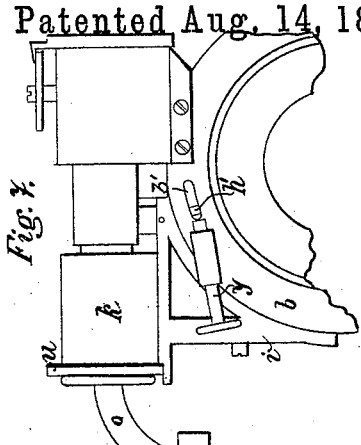
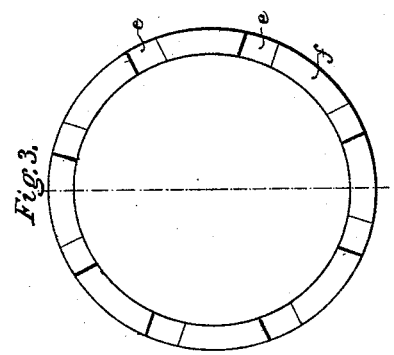
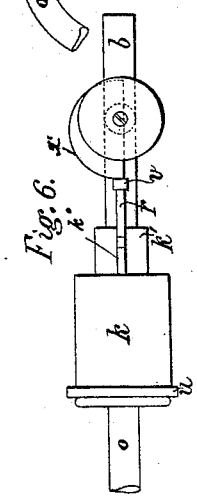
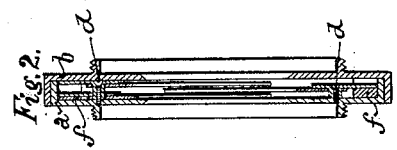
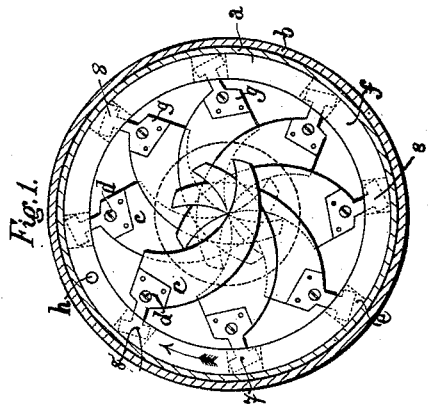
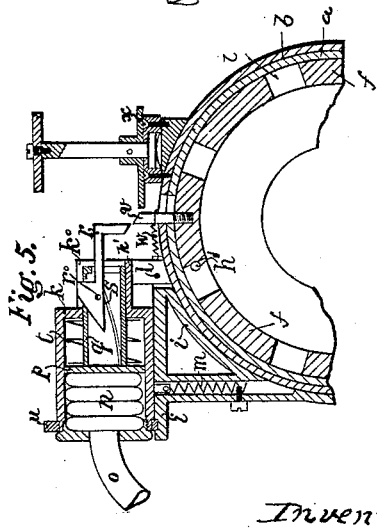
Witnesses:
Inventors:
Paul Rudolph
Oswald Näther
by Marcellus Bailey Atty (No Model.) 3 Sheets—Sheet 2.
P. RUDOLPH & O. NÄTHER.
IRIS DIAPHRAGM SHUTTER.
No. 524,670. Patented Aug. 14, 1894.
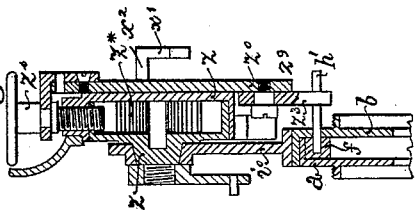
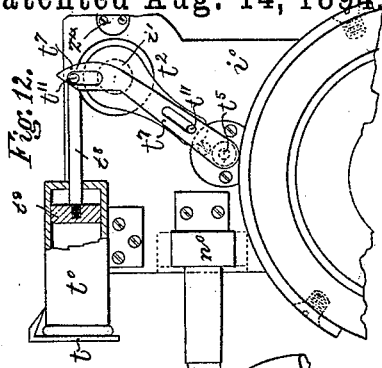
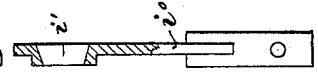
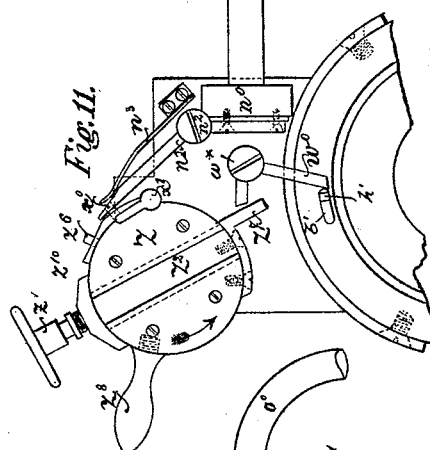
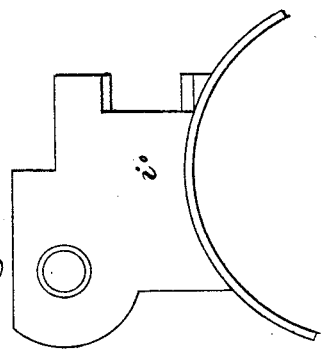
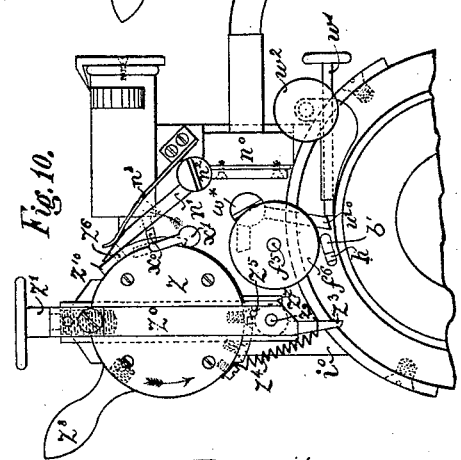
Witnesses:
Inventors:
Paul Rudolph
Oswald Näther (No Model.)  3 Sheets—Sheet 3.

P. RUDOLPH & O. NÄTHER.
IRIS DIAPHRAGM SHUTTER.

No. 524,670.  Patented Aug. 14, 1894.

Witnesses:

Inventors:
P. Rudolph &
O. Näther
by Marcellus Bailey Atty.

THE NORRIS PETERS CO., PHOTO-LITHO., WASHINGTON, D. C.

UNITED STATES PATENT OFFICE.

PAUL RUDOLPH AND OSWALD NÄTHER, OF JENA, GERMANY, ASSIGNORS TO THE FIRM OF CARL ZEISS, OF SAME PLACE.

IRIS-DIAPHRAGM SHUTTER.

SPECIFICATION forming part of Letters Patent No. 524,670, dated August 14, 1894.

Application filed June 12, 1893. Serial No. 477,391. (No model.)

*To all whom it may concern:*

Be it known that we, PAUL RUDOLPH, doctor of philosophy, a subject of the Duke of Saxe-Altenburg, and OSWALD NÄTHER, a subject of the King of Saxony, both residing at Jena, in the Grand Duchy of Saxe-Weimar, German Empire, have invented new and useful Improvements in Iris-Diaphragm Shutters for Photographic Objectives, of which the following is a specification.

The present invention relates to an iris-diaphragm shutter for photographic objectives and to the mechanisms for operating such diaphragm shutter for long as well as for instantaneous exposures.

The invention consists in a completely closing iris-diaphragm shutter, the construction of which is peculiar in shape, arrangement and operation of the blades so as to make it preferably appropriate to be used as a camera shutter, and in means for moving this shutter arranged in such way, that the use of the iris-shutter as a mere diaphragm is not prejudiced.

Figure 14:
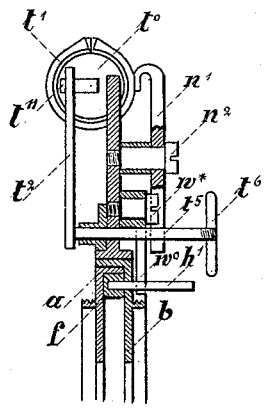
Figure 15:
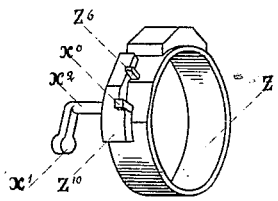

In the accompanying drawings: Figure 1 represents a front view of the iris diaphragm shutter the casing being sectioned transversely to the axis, and Fig. 2 represents a section through the iris diaphragm shutter and its casing along the axis. Figs. 3 and 4 represent a front view and a side view of the ring which embraces and operates the blades of the iris-diaphragm shutter. Fig. 5 represents a sectional view of a mechanism for operating the iris-diaphragm as a shutter arranged on the casing of the diaphragm. Fig. 6 represents a plan view of this mechanism, and Fig. 7 a front view of the same with its cover, corresponding to the sectional view of Fig. 5. Figs. 8 and 9 represent a front-view and a side-view of a support fixed on the periphery of the shutter casing for bearing another operating mechanism. Fig. 10 represents a front-view of this mechanism itself the shutter being closed and the motive spring wound up. Fig. 11 represents a like view, the shutter being open and the mechanism stopped in its way. Fig. 12 represents a back-view of the mechanism, and Fig. 13 a diametrical section through the spring casing. Fig. 14 represents another cross section of the mechanism showing other parts of it. Fig. 15 represents a perspective view of a part of the spring casing carrying some parts of the stopping device.

The casing of the iris-diaphragm shutter is formed by two circular cups $a$ and $b$ placed one into the other, with sufficiently wide concentrical circular apertures. On the cup $a$ the blades $c$ are fitted, which turn round the fixed points $d$. The blades $c$, the shape of which depends upon the required greatest opening and the number of which depends upon the required more or less circular form of said opening, are, at the end where they are connected to the ring $f$, I-shaped so as to form suitable heads guided in recesses $e$ of the operating ring $f$ (Figs 3 and 4). The recesses $e$ are open at one side and their depth is gradually increasing corresponding to the different positions of the blades $c$, which overlap each other successively and in parallel planes.

The material for the blades may be of any kind, also that for the other parts of the iris. It is necessary however, that the thin blades should be impermeable to actinic light, and they must not reflect actinic light nor get rusty. Thin ebonite plates are suitable for this purpose and each of them may be riveted at the exterior end to a small metal plate $g$ terminating into the guide head.

The shutter shown by Fig. 1 consists of nine blades of which eight are visible. The ninth or undermost, arranged beneath the first or top-blade, serves to more effectually exclude the light. A stud $h$ firmly connected with the operating ring $f$, enables the diaphragm to be opened or closed from the outside. The lid $b$ of the iris-casing affords a safe guide to the operating ring $f$ and unites all parts of the shutter.

If the stud $h$ is moved by hand in the direction of the arrow the shutter opens, that is to say the blades $c$ are swung outwardly and by this produce an opening at the center of the shutter. By moving the stud $h$ in the opposite direction the shutter is closed. The operating ring $f$ acts on the blades near their pivoting points $d$ and in consequence thereof it has to make but a small movement for completely opening or closing the shutter. This is an important advantage if the shutter is to be opened and closed instantaneously. Another advantage as to the velocity and sureness of operating the shutter is presented by the very small friction of the blades $c$. These blades being coupled by means of the guide heads with the ring $f$ in their proper planes and the guide heads being connected with the blades also in the planes common to both, that is to say, without intermediate parts bent at angles, there is no occasion to turn the blades out from their planes, whereby their inner extremities might become hooked together, when the diaphragm is closed, or at least might impede each other producing great friction.

The mechanism for operating the shutter represented in Figs. 5 to 7 is moved by pneumatic or other power and is applicable for long as well as instantaneous exposures. The mechanism is mounted on the shutter casing by means of a support $i$ fixed by screws on the periphery of the cup $b$. On the support $i$ is arranged the box $k$ one end of which is pivoted at the point $l$ of the support, while the other end is kept against the support by a spring $m$ attached to the latter, which enables this end of the box to be raised by turning an eccentric ring $u$ surrounding it and resting on the support $i$.

The box $k$ contains the parts serving to open the iris.

$n$ is a rubber case which is connected air tight by a tube $o$ with an india rubber ball not shown in the drawings.

$p$ is a disk soldered concentrically to a narrower hollow-cylinder $q$.

$r$ is a hook-shaped arm pivotally fixed on the pin $r^0$ in the hollow-cylinder $q$, and held in its position by the spring $s$. The disk $p$ is safely guided on its periphery in the box $k$ and further by means of the hollow-cylinder $q$ which is fitted into the narrow part $k'$ of the box $k$, and by the pivoted part of the hook $r$ projecting in a corresponding slot $k^0$ of the narrow part $k'$ of the box $k$. A spiral-spring $t$ presses the disk $p$ with slight pressure against the case $n$.

The spiral spring $w$, fixed to the support $i$ or to the casing $b$ of the shutter, and connected with stud $v$ of the operating ring $f$ tends to keep the shutter closed with a slight force.

For instantaneous exposures the mechanism acts in the following manner: By pressure upon the rubber ball, the case $n$ expands and as this expansion can take place only in the direction toward the movable part consisting of the disk $p$, the cylinder $q$ and the hook $r$ the latter is driven forward. If the box $k$ lies as shown in Fig. 5 the hook $r$ does not touch the stud $v$ during its rectilinear movement to the right. But if the eccentric ring $u$ is turned more or less so as to raise the left end of the box $k$, the hook $r$ engages the stud $v$ and by this opens the shutter to a greater or less distance, viz., until the hook $r$ glides over the top of the stud $v$. When this is done, the spring $w$ draws back the stud $v$ of the operating ring $f$, whereby the shutter is again closed as has been explained above. If the pressure upon the ball is released, the hook $r$ is also driven backward by the spring $t$ and returns into its original position being allowed by the spring $s$ to glide over the stud $v$. The iris shutter is then again ready for the next exposure. By exercising a gradually increasing or a sudden strong pressure upon the ball, the time of exposure may at will be extended or shortened.

In order to make long exposures, the back-end of the box $k$ is raised by the eccentric $u$ to lower the hook $r$ so much that it cannot glide past $v$ even at the widest opening of the shutter and the latter remains open as long as the pressure upon the ball lasts. In this case the width of the aperture of the shutter can be regulated at will by turning more or less a cam $x$, which is horizontally arranged on the shutter casing and by which the stroke of the stud $v$ may be limited to a longer or shorter extent.

In order to fix the iris diaphragm at any degree of aperture independent of the mechanism operating the same as a shutter an adjustable pin $y$ (Fig. 7) is arranged on the front side of the casing $b$ of the iris diaphragm, opposite to a stud $h'$ fixed to the operating ring $f$ and projecting through a slot $b'$ of the casing $b$. The pin $y$ prevents the diaphragm being closed while the spring $w$ working on the stud $v$ or the suitably adjusted cam $x$ prevents it from being accidentally opened wider. This arrangement serves for the convenient adjustment or focusing of the image to be reproduced, and moreover enables the iris diaphragm to be conveniently used not as a shutter but only as objective diaphragm for exposures the length of which is to be limited by means of the objective protecting cap or by similar means.

The mechanism for operating the shutter as represented in Figs. 8 to 15 is provided with a motive spring, and the rapidity of its movement may be mechanically regulated. This mechanism is also fixed on the shutter-case $b$ by means of a support $i^0$ screwed directly on the periphery of the casing $b$ and carrying all parts of the mechanism. $z^*$ (Fig. 13) is the main spring fixed with its exterior end to the support at $z^{**}$ (Fig. 12) and with its interior end to the spring casing $z$, which is pivoted at $i'$ in the support $i^0$. $z^0$ is a slide which is guided in the dove-tail-shaped diametrical slit $z^2$ of the spring casing $z$. At the point $z^9$ of the lower end of this slide $z^0$ an arm or lever $z^3$ is pivoted and held in its position by the spiral spring $z^4$ at one side and the stop $z^5$ at the other side. A set screw $z'$ screwed into the upper part of the spring casing $z$, and connected with the slide $z^0$ serves as the means whereby the slide may be moved in its bearing, such movement being for the purpose of causing the lever $z^3$ to project more or less from the spring casing. On the lower part of the spring casing $z$ a bracket $z^7$ is secured, which is adapted to engage the upper arm of a bell crank lever $w^0$ pivoted on the support $i^0$ by means of a screw $w^*$. A handle $z^8$ is screwed into the upper part of the spring casing, and serves for winding the spring $z^*$ by turning the spring case in a direction contrary to the arrow on Figs. 10 and 11. For catching the spring case after the spring has been wound, it is provided with a bracket $z^{10}$ and a stud $z^6$, with which latter engages the hook-shaped upper arm of a lever $n'$ pivoted at $n^2$ on the support $i^0$. A spring $n^3$ presses this arm against the bracket $z^{10}$ so that its hook (Fig. 14) is able to catch the stud $z^6$ of the spring casing. The lower arm 3 of the lever $n'$ is secured to a bellows contained in the case $n^0$, and connected by the tube $o^0$ with a rubber ball not shown in the drawings. By pressing the rubber ball and expanding the bellows in the casing $n^0$ the lever $n'$ is turned in the direction of a watch hand and its upper extremity is disengaged from the stud $z^6$. Then the motive spring $z^*$ drives the spring case $z$ in the direction of the arrow (Figs. 10 and 11), and the lever $z^3$ engages the stud $h'$ of the operating ring $f$ of the shutter, opening the latter, until the point of the lever $z^3$ glides over the stud $h'$, so that the opening of the shutter is stopped. The spring case $z$ in the next part of its rotary movement engages the upper shorter arm of the bell crank lever $w^0$ by means of the bracket $z^7$ so as to move to the left the lower longer arm of this lever, which pushes backward the stud $h'$ of the shutter. When the stud $h'$ has reached its utmost left position in the slot $b'$ of the shutter case, the shutter is closed, and the spring case $z$ stopped by the engagement of the parts $h'$, $w^0$, $z^7$.

The operation as described causes an instantaneous exposure, there being only a small rest between the opening and the closing of the shutter. The width of aperture of the shutter may be regulated by the position given to the slide $z^0$ by means of the screw $z'$ so as to allow the lever $z^3$ to glide sooner or later over the stud $h'$. To prevent the blades of the shutter from continuing on their way by inertia after the lever $z^3$ is disengaged from the stud $h'$ so as to open the shutter wider than required and intended, a pin $w'$ is secured to the shutter case and adapted to be adjusted and to be fastened by a pinching screw $w^2$. By this pin the stroke of the lever $w^0$ may be limited in this way, that simultaneously when the point of the lever $z^3$ glides over the stud $h'$, the stud $h'$ touches the lever $w^0$ and the latter touches the pin $w'$.

For the purpose of being enabled to vary the time required for instantaneous exposures the mechanism may be completed by an adjustable air brake device, for example, as shown in the drawings. The piston $t^9$ of the air brake cylinder $t^0$, which latter is of the customary construction and regulated in the usual manner by the disk $t'$, is connected with a link $t^2$ by means of a peg $t^{11}$ of the piston rod $t^8$ engaging a slot $t^3$ of the said link. Another slot $t^7$ of this link is engaged by the pin $t^4$ of a crank $t^{10}$ secured to the spring case $z$. To disconnect the spring case and the air brake, the shaft $t^5$ of the link $t^2$ mounted in the support $i^0$ may be moved endwise by pushing the button $t^6$ secured to it so as to disengage the slots $t^7$ and $t^3$ from the pins $t^4$ and $t^{11}$ of the crank and the piston rod respectively. See Figs. 12 and 14.

In order to use the shutter at will for exposures of any length, as well as for instantaneous exposures, as described, in the bracket $z^{10}$ a shaft $x^2$ is mounted, one end of which is provided with a peg $x^0$ while the other end carries a handle $x'$. By means of the latter the peg $x^0$ may be turned either to stand upward into the way of the hook shaped end of the lever $n'$ or to lie aside under the level of the bracket $z^{10}$. In the latter case the described working of the mechanism is not altered. In the first mentioned position the peg $x^0$ is engaged by the hooked end of the lever $n'$ which stops the movement of the spring casing, when the shutter has been opened to the required extent and before it is reclosed. When the intended time of exposure is passed, a second release of the spring casing produced by operating the pneumatic device closes the shutter by the means set forth above.

In conclusion we desire it to be understood that by our claims we intend and mean not only an iris diaphragm shutter, but a diaphragm as well, the means by which said diaphragm is adapted for both uses having been hereinbefore shown and described.

What we claim is—

1. In a photographic shutter the combination of the blades mounted in different planes, and an operating ring engaging directly with each of the said blades in the plane of the blade, substantially as and for the purpose set forth.

2. In a photographic shutter, the combination of the casing, the blades of suitable shape, arranged in different planes, an operating ring provided with recesses whereby it engages with the several blades, a stud secured to the operating ring and extending outside the casing, an arm arranged to engage with the said stud when moved in one direction, means for moving the said arm, and means for moving backward the said stud, substantially as and for the purpose set forth.

3. In a completely closing iris diaphragm shutter for photographic objectives the combination with suitably shaped outer ends of the iris blades, of an operating ring provided with recesses whereby it engages directly with the blades overlapping each other, a stud fixed to the operating ring and projecting through the iris-casing, a spring-actuated rocking arm of adjustable length, means for releasing this arm and means for removing and catching it, a second arm engaging the stud, pivoted at the end of the first arm, and held in one direction by means of a spring and a stop, and a lever turned by the pivoted arm, when the same has passed the stud, so as to move backward the latter, substantially for the purpose and in the manner as shown and described.

4. In a completely closing iris diaphragm shutter for photographic objectives the combination with suitably shaped outer ends of the iris-blades of an operating ring provided with recesses with which engage ends of the blades, a stud fixed to the operating ring, a spring-actuated adjustable rocking arm, a second arm pivoted on the end of the first and engaging successively the stud and a bell-crank-lever moving backward the stud, a device for stopping the movement of the adjustable arm, when the iris is open, consisting of a pivoted pin or stud, which may be turned into two rectangular positions, a spring-controlled lever checking the adjustable arm in its working position and checking it a second time after the opening of the iris, the whole substantially for the purpose and in the manner set forth.

In testimony whereof we have hereunto set our hands in the presence of two subscribing witnesses.

PAUL RUDOLPH.
OSWALD NÄTHER.

Witnesses:
   CARL BORNGRAEBER,
   HEINRICH GUSTAV HOEFLER.